United States Patent
Narducci

(10) Patent No.: US 9,623,518 B2
(45) Date of Patent: Apr. 18, 2017

(54) POSITIONER FOR TUBES

(71) Applicant: A. NARDUCCI S.P.A., Stezzano (IT)

(72) Inventor: Antonio Narducci, Bergamo (IT)

(73) Assignee: A. Narducci S.P.A. (IT)

( * ) Notice: Subject to any disclaimer, the term of this patent is extended or adjusted under 35 U.S.C. 154(b) by 0 days.

(21) Appl. No.: 14/916,879

(22) PCT Filed: Aug. 28, 2014

(86) PCT No.: PCT/IB2014/064111
§ 371 (c)(1),
(2) Date: Mar. 4, 2016

(87) PCT Pub. No.: WO2015/033255
PCT Pub. Date: Mar. 12, 2015

(65) Prior Publication Data
US 2016/0199949 A1   Jul. 14, 2016

(30) Foreign Application Priority Data
Sep. 4, 2013   (IT) .............................. BG2013A0026

(51) Int. Cl.
*B23K 37/053* (2006.01)
(52) U.S. Cl.
CPC .............................. *B23K 37/0538* (2013.01)
(58) Field of Classification Search
CPC .......... B23Q 3/00; B25H 1/0007; B25H 1/00;
B25B 5/006; B66F 7/22; A43D 71/02
USPC ...................... 269/55, 60, 17, 95; 248/349.1;
414/222.01–226.15
See application file for complete search history.

(56) References Cited

U.S. PATENT DOCUMENTS

| 2,716,178 A | * | 8/1955 | Wallace | B23K 37/0426 219/158 |
| 2,738,082 A | * | 3/1956 | Vernon | B23K 37/0538 414/433 |
| 2,854,216 A | * | 9/1958 | Bjalme | E21B 19/164 166/77.51 |
| 3,007,428 A | * | 11/1961 | Wuesthoff | B23K 37/0538 269/55 |
| 3,448,877 A | * | 6/1969 | Pandjiris | B23K 37/0538 414/433 |
| 3,695,468 A | | 10/1972 | Stevens et al. | |
| 3,863,792 A | * | 2/1975 | Kopczynski | B24B 41/06 414/433 |
| 3,976,281 A | * | 8/1976 | Adamson, Jr. | B66F 7/0633 254/126 |
| 4,804,813 A | * | 2/1989 | Tesch | B23K 9/0286 219/59.1 |

(Continued)

FOREIGN PATENT DOCUMENTS

| DE | 2653195 A1 | * | 6/1977 | ......... B23K 37/0538 |
| FR | 2698816 A1 | | 6/1994 | |
| FR | 2702690 A1 | * | 9/1994 | ......... B21C 37/0807 |

*Primary Examiner* — George Nguyen
(74) *Attorney, Agent, or Firm* — King & Schickli, PLLC

(57) ABSTRACT

Roller positioner for tubes comprising: a base structure; two lower support rollers rotating around respective axes positioned on said base structure; and an upper roller antagonist to said two lower support rollers; characterized by comprising a deformable quadrilateral for the movement of said upper roller suited for moving said upper roller along a rectilinear axis by a predetermined distance and then away from said rectilinear axis.

10 Claims, 4 Drawing Sheets

(56) References Cited

U.S. PATENT DOCUMENTS

Figure 1:
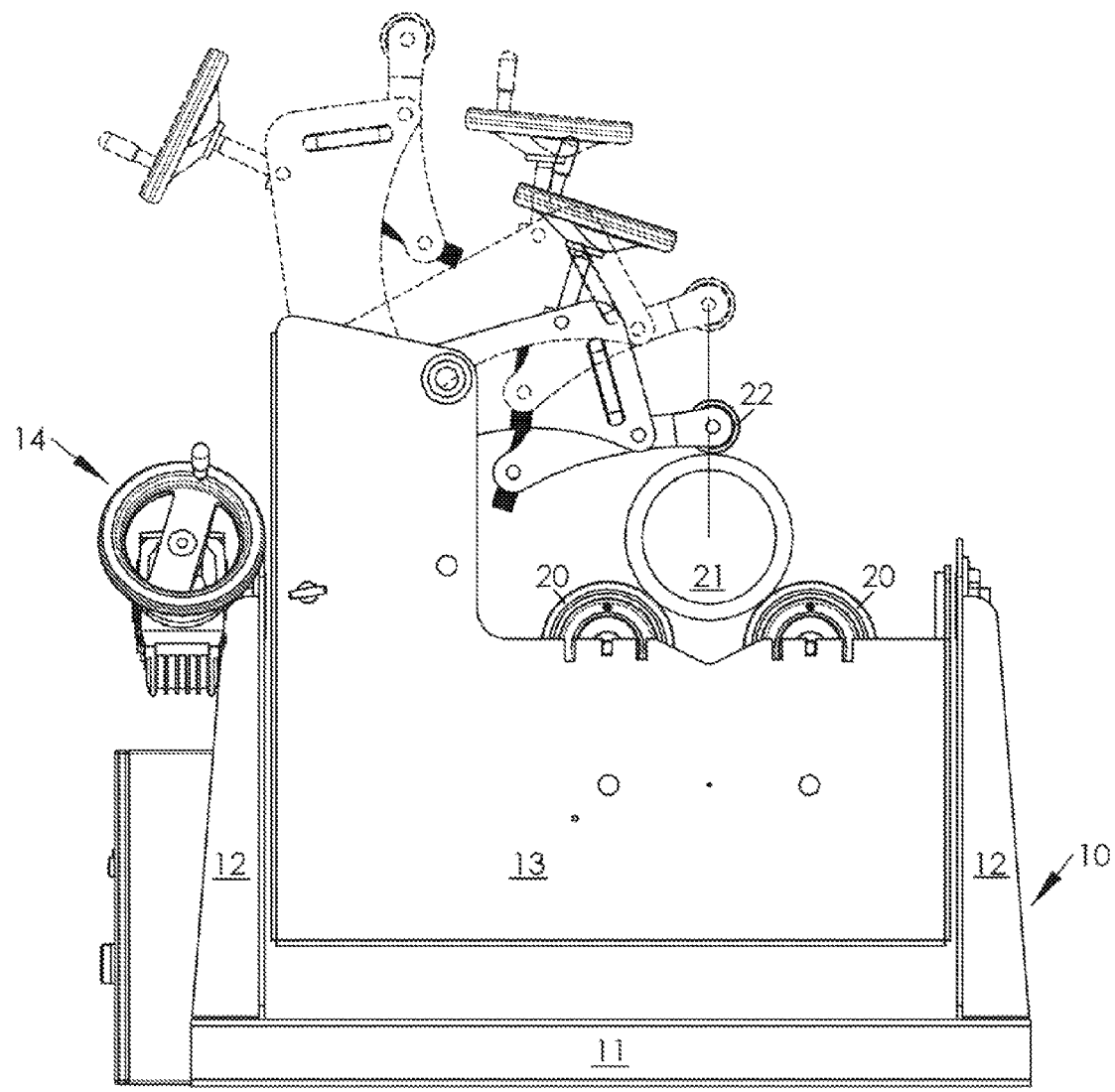

| | | | | |
|---|---|---|---|---|
| 5,934,626 | A * | 8/1999 | Collins, Jr. | B23K 37/0538 248/132 |
| 6,244,662 | B1 * | 6/2001 | Porcheron | A61G 5/14 297/383 |
| 8,118,293 | B1 * | 2/2012 | Barger | B23Q 7/05 144/287 |
| 8,413,958 | B2 * | 4/2013 | Zhu | B66F 7/0641 254/10 B |
| 8,777,203 | B2 * | 7/2014 | Lee | B23Q 1/527 269/55 |
| 2003/0205560 | A1 * | 11/2003 | Desloge | B23K 9/0286 219/61 |
| 2009/0001643 | A1 * | 1/2009 | Rehm | B23Q 1/76 269/55 |
| 2010/0244347 | A1 * | 9/2010 | Davi | B21C 37/0803 269/71 |
| 2011/0109030 | A1 * | 5/2011 | Flaig | B23K 37/0538 269/55 |
| 2011/0233986 | A1 * | 9/2011 | Obermeyer | B60P 1/28 298/22 R |

\* cited by examiner

POSITIONER FOR TUBES

This application is the national stage of PCT/IB2014/064111, filed Aug. 28, 2014, which claims priority from Italian Application No. BG2013A000026, filed Sep. 4, 2013.

FIELD OF INVENTIION

The present invention relates to a positioner for tubes, and in particular to a roller positioner for tubes.

In the metal framework and boiler factory field it is commonplace the presence of machines suitable for arranging the work-piece in the best position for performing on the same welding and like operations (grinding, cutting etc.). Said machines are therefore called "welding positioners" and are divided into two main to categories.

The table positioners, characterized by a work-piece holding table, tiltable, rotating and possibly adjustable in its height from the ground, on whose surface the work-piece is clamped.

The roller positioners which are machines used to support cylindrical bodies (tubes) by means of elements each constituted by a crosspiece and two work-piece support rollers. In said case, the only movement of the work-piece is a rotation with respect to its longitudinal axis.

BACKGROUND OF THE INVENTION

In parallel, in common workshop use, particularly in the field of plumbing, i.e. those companies and/or units specialized in the production of tubes, flanged fittings, manifolds with joints etc. has stimulated the development of another category of positioners which is located, by its type of use and conformation, between the two main categories introduced above.

Said solution provides two lower support rollers and one upper "antagonist" roller which by tightening upon the work-piece ensures gripping thereof. The gripping is obtained by way of a fixed support column of the antagonist roller and by an adjusting screw for approaching the roller to the work-piece.

The solution is effective but the presence of the counter-roller "in irremovable position" makes the loading and unloading operations of the work-piece uncomfortable, in addition to imposing relatively narrow limits on the diameters of the loadable pieces.

SUMMARY OF THE INVENTION

Purpose of the present invention is to provide a positioner for tubes provided with an antagonist gripping element which obviates the drawbacks of the known art.

Another purpose is to provide an antagonist element suited to allow loading the piece from above without interference of structural elements.

A further purpose is to provide a positioner for tubes having reduced transversal structural dimensions suitable to allow loading of work-pieces with curves and/or close joints.

Another purpose is to provide a positioner for tubes having swiveling capacity in order to allow tilting of the work-piece.

According to the present invention, said purposes and further purposes are achieved by a roller positioner for tubes comprising: a base structure; two lower support rollers rotating around respective axes positioned on said base structure; and an upper roller antagonist to said two lower support rollers; characterized by comprising a deformable quadrilateral for the movement of said upper roller suitable for moving said upper roller along a rectilinear axis by a predetermined distance and then away from said rectilinear axis.

Further characteristics of the invention are described in the dependent claims.

The advantages of this solution compared to the solutions of the prior art are various.

The implementation of an antagonist counter roller with respective "removable" support arm has led to the implementation of a deformable quadrilateral geometry.

The antagonist counter roller, in order to properly "grip" the work-piece must be able to maintain itself along the vertical axis that crosses the center or, at least, to deviate to a limited extent from said trajectory.

The counter roller is kept, along its vertical stroke, close to the vertical line passing through the rotation center of the loaded work-piece. Once a height corresponding to the maximum gripable diameter is reached, kinematics deviates the motion of the counter roller allowing it to move further away from the vertical trajectory for following a parabola that leads it away from the work area.

BRIEF DESCRIPTION OF THE DRAWING FIGURES

Figure 2:
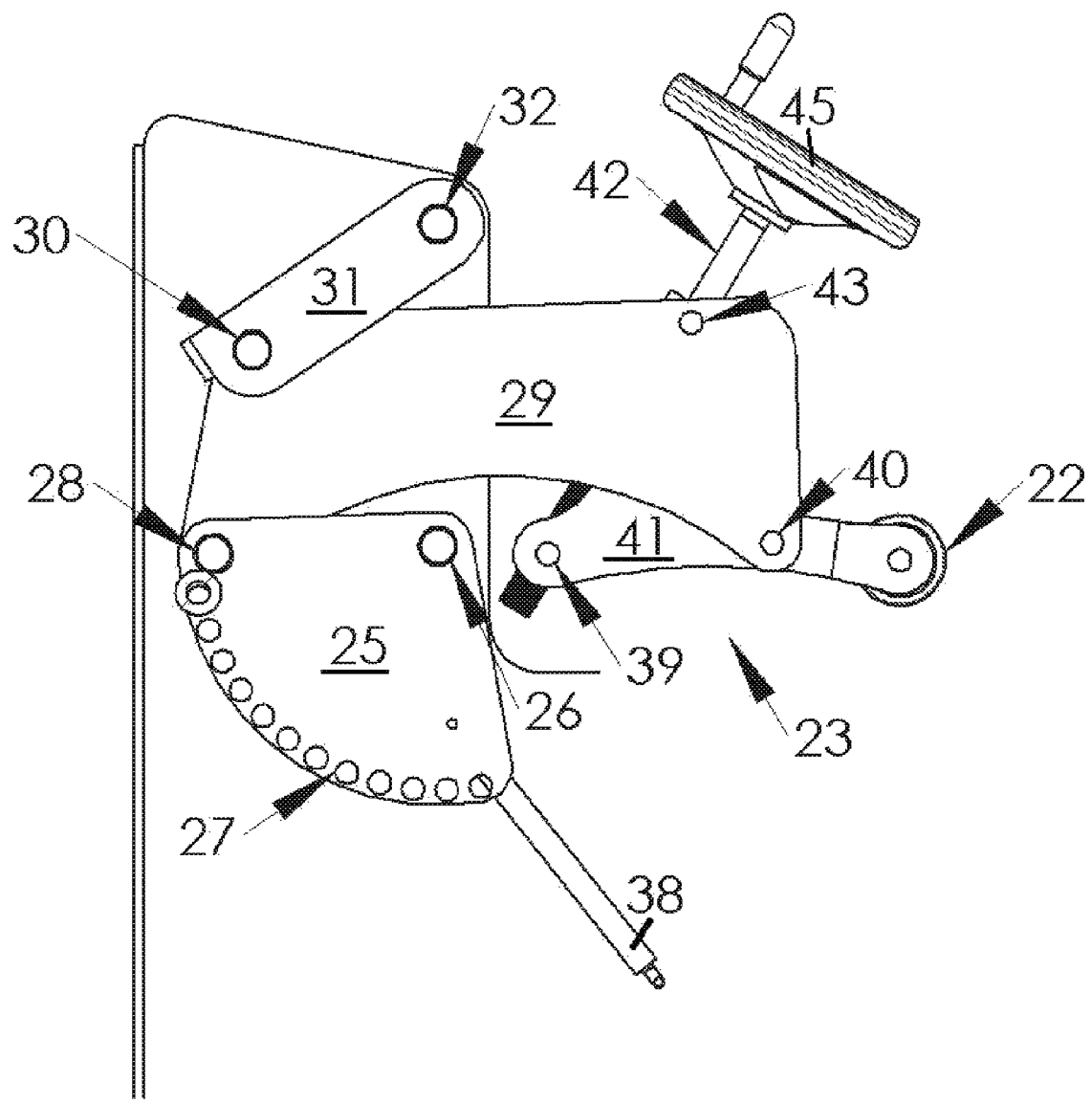
Figure 4:
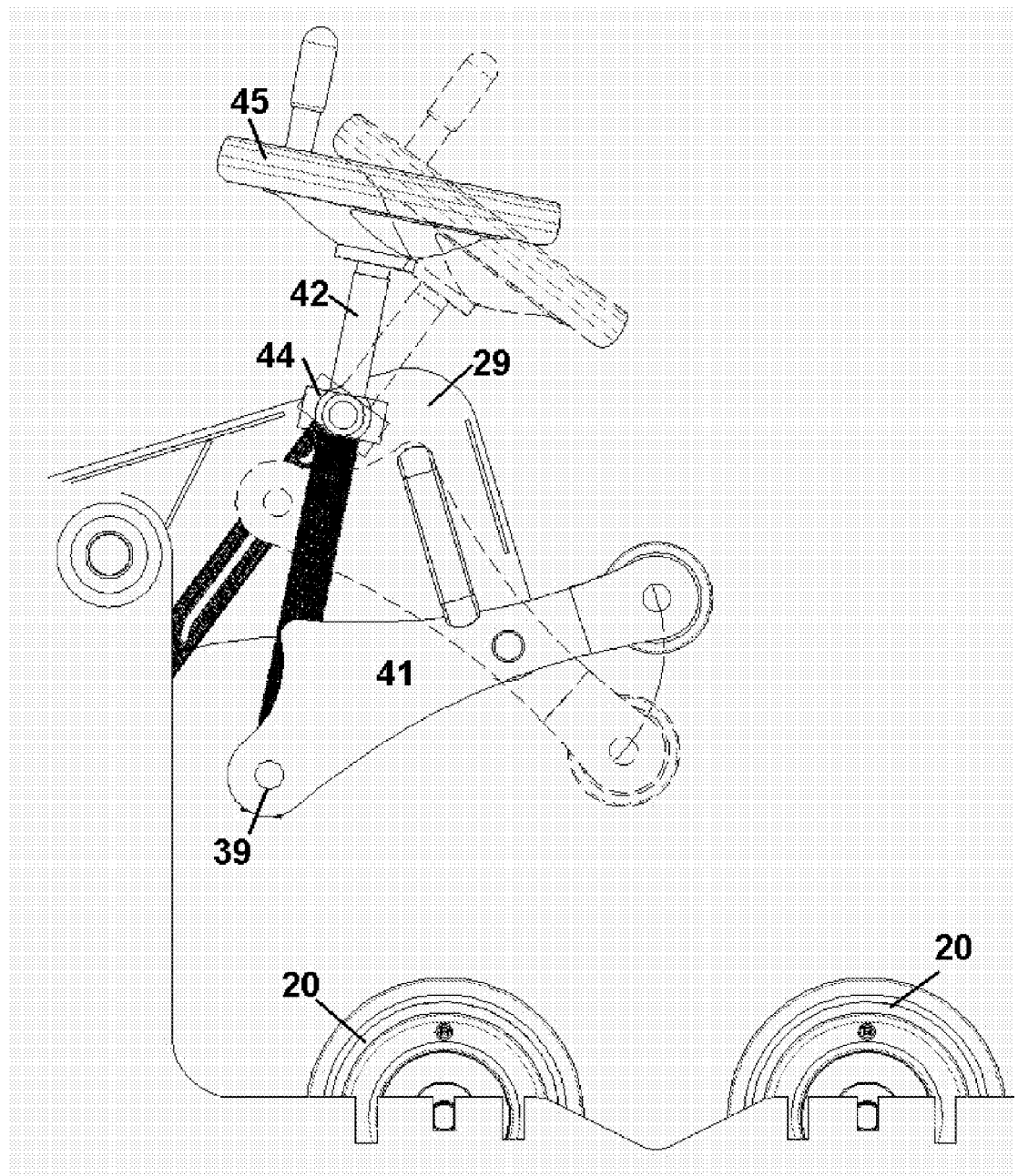

The characteristics and advantages of the present invention will become apparent from the following detailed description of a practical embodiment thereof, illustrated by way of a non-limiting example in the accompanying drawings, wherein:

FIG. 1 schematically shows a positioner for tubes, according to the present invention;

FIG. 2 schematically shows part of the kinematic mechanisms of a positioner for tubes, according to the present invention;

FIGS. 3a, 3b, 3c and 3d show schematically the movements of a deformable quadrilateral of a positioner for tubes, according to the present invention;

FIG. 4 schematically shows the fine adjustment of the counter roller of a positioner for tubes, according to the present invention.

DETAILED DESCRIPTION OF THE INVENTION

Referring to the attached figures, a positioner for tubes, according to the present invention, comprises a positioner support structure 10. The structure is composed by a base 11 and by two vertical wings 12.

To the two wings 12 a swiveling container 13 is hinged so as to be movable. The container 13 can then be tilted and fixed in said position by way of adjusting and fixing means 14.

The container 13 is composed of two lateral substantially L-shaped walls, closed by two rectangular walls.

Located inside the container 13 are the kinematic mechanisms of the positioner.

Two support rollers 20 are rotatable around horizontal pins positioned on the horizontal L-shaped portion of the container 13. The rollers 20 are operable in a known manner by means of motors and controls not shown.

Positioned above the support roller 20 is the tube 21 to be worked.

As known, opposed to the support rollers 20 is necessary an upper "antagonist" roller or counter roller 22 that by tightening upon the tube 20, in association with the rollers 20, ensures gripping.

The kinematic mechanisms 23 for moving the counter roller 22, which are obtained by way of a deformable quadrilateral, are arranged mainly in the vertical portion of the L-shape of the container 13.

The kinematic mechanisms 23 comprise a lower connecting rod 25, which for locking reasons of the kinematic mechanisms 23 themselves, has substantially the shape of a circular sector.

The lower connecting rod 25 has a pin 26 arranged at the center of the circular sector forming the lower connecting rod 25, and a plurality of holes 27 along the arc of the circular sector.

The lower connecting rod 25 can then rotate around the pin 26 with respect to the vertical portion of the L-shape of the container 13.

Furthermore it has a pin 28 arranged at the upper end of the circular sector arc forming the lower connecting rod 25.

The pin 28 also passes through a hole in a bottom corner (left) of an oscillating arm 29, having a substantially rectangular shape, with the lower side (with respect to FIG. 2) recessed inwards leaving space for other kinematic mechanisms.

In the upper corner (left with respect to FIG. 2) of the oscillating arm 29, in the proximity of the pin 28, there is another pin 30 connected to an upper connecting rod 31 having at the other end, a pin 32 connected to the upper vertical part of the L shape of the container 13.

The pins 32 and 26 are attached on the container 13, and therefore are fixed.

The pin 28 is fixed between the lower connecting rod 25 and the oscillating arm 29. The pin 30 is fixed between the oscillating arm 29 and the upper connecting rod 31. Therefore these two pins 28 and 30 move freely and are not connected to fixed structures.

Comprised on the lower corner (right) of the swinging arm 29 there is a pin 40 around which an arm 41 can rotate on whose end the counter roller 22 is arranged.

The pin 40 is arranged substantially at the center of the arm 41.

The arm 41, at the opposite end of the counter roller 22 is hinged on the pin 39 with the end of a threaded bar 42. On the oscillating arm 29 in its upper corner 43 (right), an internally threaded bushing 44 is pivoted, in which the bar 42 passes through. Above the bushing 44, the bar 42 comprises a hand wheel 45.

By maneuvering the hand wheel 45, the arm 41 is made to rotate around the pin 40 and the counter roller 22 can perform an upwards or downwards arc.

The movement of the kinematic mechanism is assisted by a gas spring 38 connected between the container 13 and the lower connecting rod 25.

The operation of the invention appears evident to the skilled in the art from what has been described and, in particular, is the following.

Figures 3A, 3B:
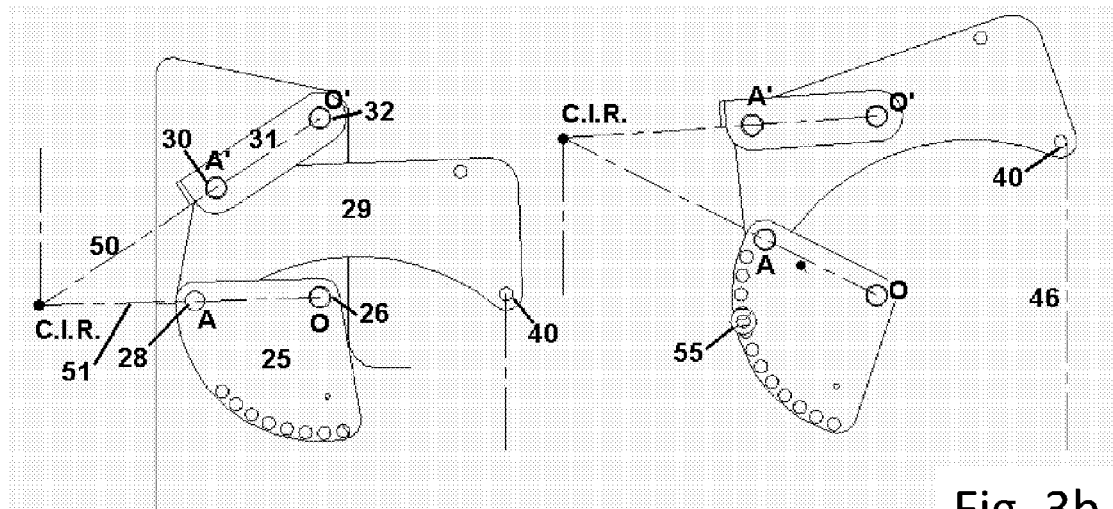

In FIG. 3a the working position is shown, i.e. when the counter roller 22 is placed over the tube 21, and the pins 26 and 28, of the lower connecting rod 25, are substantially horizontal, like the oscillating arm 29 and the arm 41. The upper connecting rod 31 is inclined downwards from pin 32 by about 45°.

In particular, note the position of the pin 40 that lies along a vertical axis 46.

The pin 40 supports the arm 41, fixed in position by the hand wheel 45, which will move accordingly, and therefore the counter roller 22 will move with a movement similar to that of the pin 40.

By pushing upwards the pin 40, the oscillating arm 29 is raised, which rotates around an instantaneous rotation center (I.R.C) which is arranged at the junction of two lines. The first rectilinear line 50 passes through the pins 30 and 32 of the upper connecting rod 31. The second rectilinear line 51 passes through the pins 26 and 28 of the lower connecting rod 25.

Figures 3C, 3D:
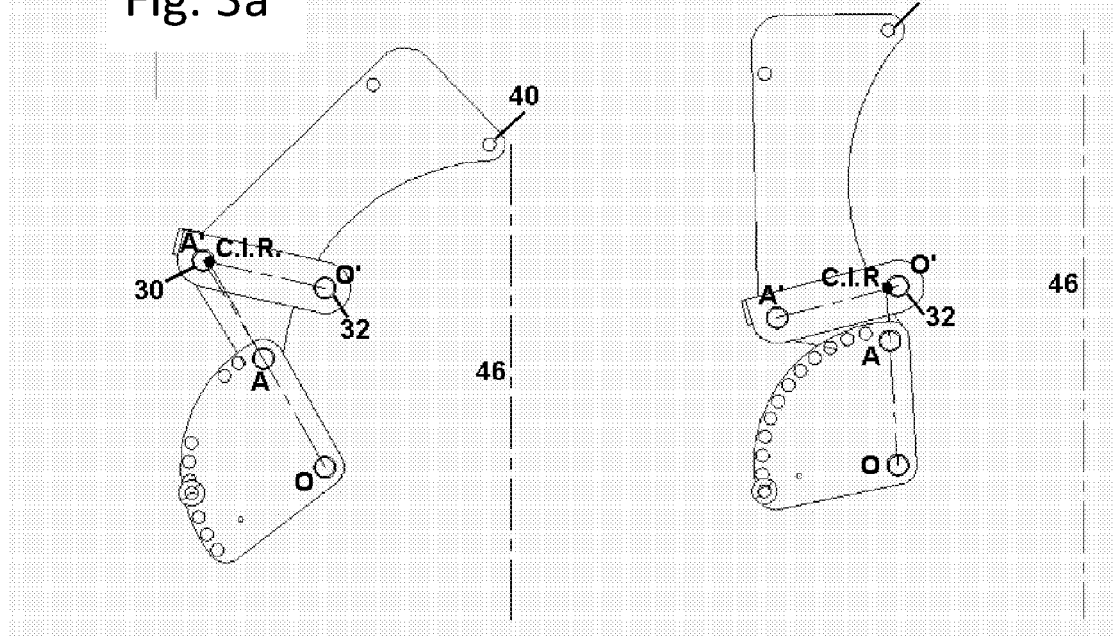

The oscillating arm 29 continues to rotate around the instantaneous rotation center, until reaching the position shown in FIG. 3c, keeping the pin 40 (and consequently the counter roller 22) always on a trajectory along the vertical axis 46.

Therefore, the movement of the pin 40 is similar to a translation motion.

As can be seen from FIG. 3c the instantaneous rotation center is located practically in the position of the pin 30, and advancing in motion, it follows a reversal of the rotation direction of the connecting rod 31, and therefore from this point on the movement proceeds with rotation movement clockwise and concordant with the two connecting rods 25 and 31 of the articulated quadrilateral, moving the pin 40 away from the axis 46.

The arm 29 initially assumes a rotary motion around the pin 30, which causes it to diverge rapidly from the working area.

The reversal of the rotation direction of the connecting rod 31 leads to a distortion of the articulated quadrilateral, the instantaneous rotation center moves gradually towards the pin 32 and the arm 29 reaches the end of stroke with the connecting rod 31 contacting the circular sector of the lower connecting rod 25.

During the movement of the kinematic mechanism, and in particular during the movement of the pin 40 along the axis 46, it is possible to lock it in the desired position by inserting a pin 55 in one of the holes 27, which will correspond to a locking hole on the container 13.

For the use of the roller positioner for tubes, according to the present invention, the kinematic mechanism is completely raised taking the counter roller 22 laterally and away from the intermediate axis to the support rollers 20.

For safety, the pin 55 is inserted in one of the holes 27 for locking the structure.

In this way ample space is left for positioning the tube 21.

With said arrangement it is possible to lower the tube 21 from above and place it comfortably on the support rollers 20, by means of a winch or other lifting means.

The pin 55 is unlocked and the counter roller 22 is lowered into position above the tube 21.

Once the position is found, the pin 55 is again locked by inserting it in the most suitable hole for the purpose.

Since this is a discrete adjustment dictated by the positioning to of the holes 27, it could happen that the counter roller is not properly placed over the tube 21.

Therefore, a fine adjustment of the positioning of the counter roller 22 can be performed by way of the hand wheel 45, which by lifting the pin 39 rotates the arm 41 around the pin 40 and pushes the counter roller 22 against the tube 21.

The movement of the kinematic mechanism described above is manual but the use of automatic handling means is possible.

Both manual and automatic alternative moving and locking methods of the kinematic mechanisms described above may also be used.

For example it is possible to arrange a motorized or manually operated worm screw acting on the lower connecting rod 25.

Or, it is possible to use a toothed sector integral with the lower connecting rod 25 and engaging on a worm reduction gear pinion.

Alternatively, the counter roller 22 could be fixed directly to the pin 40 of the oscillating arm 29, and a finer fixing adjustment than that obtained with the holes 27 on the lower connecting rod 25 can be provided, obtaining the same results of the above solution.

The materials used, as well as the dimensions, may be any according to requirements, size and weight of the tubes being worked, and to the state of the art.

The positioner thus conceived is subject to numerous modifications and variations, all falling within the inventive concept; moreover, all details are replaceable by technically equivalent elements.

The invention claimed is:

1. A roller positioner for tubes comprising: a base structure; two lower support rollers rotating around respective axes positioned on said base structure; and an upper antagonist roller to said two lower support rollers; characterized by comprising a deformable quadrilateral for the movement of said upper roller suited for moving said upper roller along a rectilinear axis by a predetermined distance and then away from said rectilinear axis.

2. The positioner according to claim 1 characterized in that said rectilinear axis is vertical.

3. The positioner according to claim 1 characterized in that said deformable quadrilateral comprises an arm at whose end said upper roller is located.

4. The positioner according to claim 1, characterized in that said deformable quadrilateral comprises discrete locking means in the desired position.

5. The positioner according to claim 1 characterized in that said arm comprises fine adjustment means of said upper roller position.

6. The positioner according to claim 5 characterized in that said fine adjustment means of said upper roller position comprise a worm screw which moves said upper roller.

7. The positioner according to claim 1 characterized in that said deformable quadrilateral comprises an upper connecting rod having a first end hinged with said base structure and a second end hinged with a first angle of an oscillating arm; it also comprises a lower connecting rod having a first end hinged with said base structure and a second end hinged with a second angle of said oscillating arm.

8. The positioner according to claim 7 characterized in that said lower connecting rod has a circular sector shape and comprises a plurality of holes along the arc of the circular sector.

9. The positioner according to claim 7 characterized in that to said oscillating arm is fixed, in a movable way, an arm at the end of which said upper roller is placed.

10. The positioner according to claim 1 characterized in that said base structure is supported by a support structure; said base structure is tiltable with respect to said support structure.

* * * * *